UNITED STATES PATENT OFFICE.

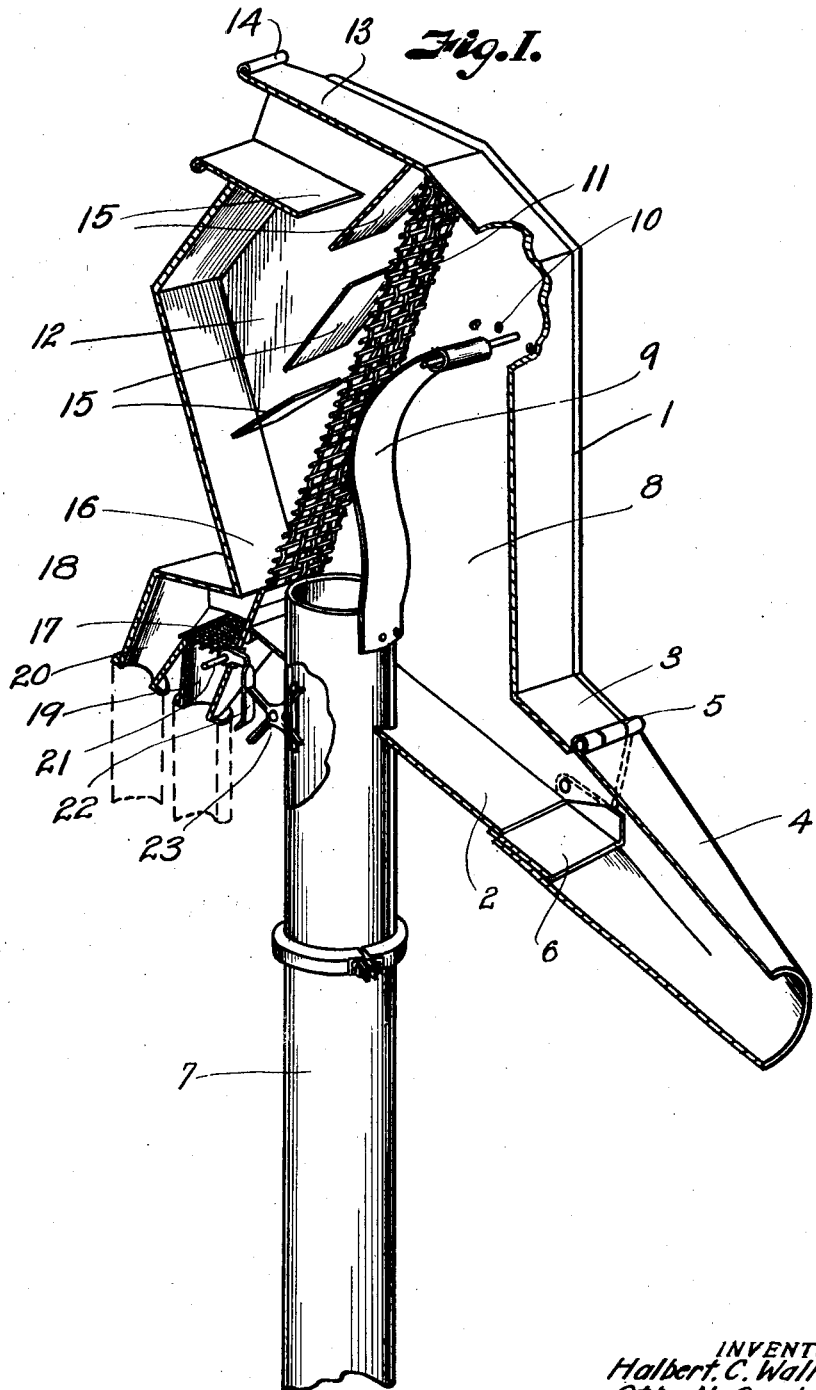

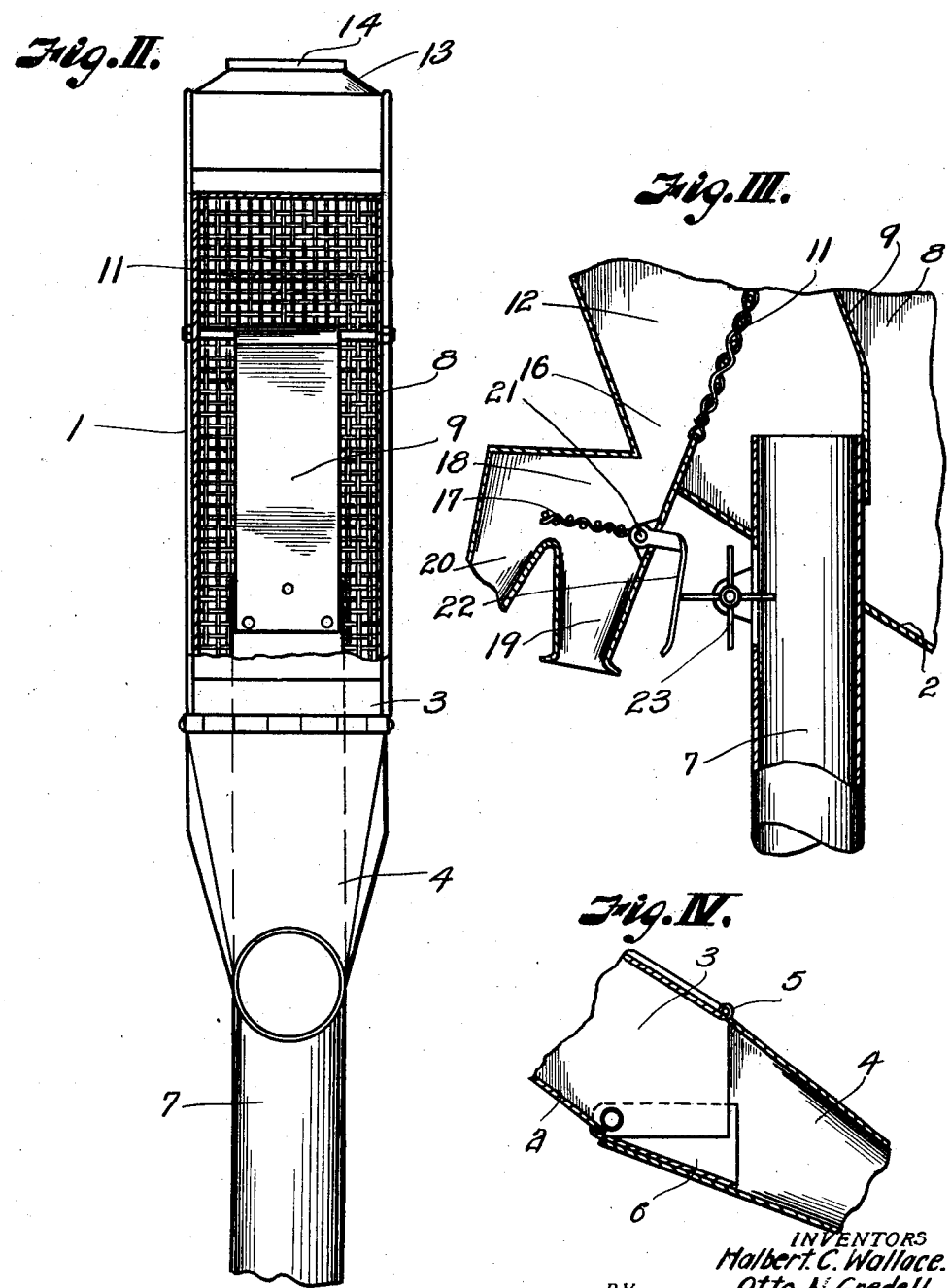

HALBERT C. WALLACE, OF KANSAS CITY, AND OTTO N. GREDELL, OF WINWOOD LAKE, MISSOURI.

GRAIN SEPARATOR AND GRADER.

1,360,834.  Specification of Letters Patent.  Patented Nov. 30, 1920.

Application filed February 14, 1920. Serial No. 358,624.

*To all whom it may concern:*

Be it known that we, HALBERT C. WALLACE and OTTO N. GREDELL, citizens of the United States, residing at Kansas City and Winwood Lake, in the counties of Jackson and Clay and State of Missouri, respectively, have invented certain new and useful Improvements in Grain Separators and Graders; and we do declare the following to be a full, clear, and exact description of the invention, such as will enable others skilled in the art to which it appertains to make and use the same, reference being had to the accompanying drawings, and figures of reference marked thereon, which form a part of this specification.

This invention relates to grain separators and graders and it is particularly adapted for use in connection with a pneumatic conveyer, the construction being such that the unclean grain can be introduced into the separator and grader so as to disassociate the heavier or more perfect grain kernels from the inferior and direct them to a suitable receptacle or repository while the dust, dirt, inferior grain and extraneous matter will be conveyed to grading nozzles or hoppers where it may be separated according to grade.

The invention contemplates the provision of means whereby the unclean grain may pass into a separator and be directed by a deflector to a screen baffle so that the first separation will result in an "A" grade product, the inferior grades being subsequently separated after the dust, dirt and extraneous matter has passed through the screen baffle.

The invention also contemplates a certain novel arrangement of parts and combination of parts which will be referred to hereinafter, it being understood that changes in form, proportion and minor details of construction may be resorted to without departing from the spirit of the invention or sacrificing any of its advantages.

In the drawings,

Figure I is a perspective sectional view through a separator and grader constructed in accordance with our invention.

Fig. II is an elevational view of one end of the separator and grader, part of the wall being broken away to show the deflector and the screen baffle.

Fig. III is an enlarged sectional view showing the grader nozzles or hoppers and the jigger with its operating mechanism, and Fig. IV is an enlarged view of the hinged joint for the "A" grade grain chute.

Referring now to the drawings by numerals of reference:

1 designates a casing or housing having an inclined bottom 2, terminating in a chute 3 to which a spout 4 is hinged at the upper edge, as indicated at 5, the lower portion of the chute 3 having a segment 6 hinged thereto to bridge the gap between the chute 3 and the spout 4 when the spout 4 is swung to various positions to accommodate different sizes of bins or grain receptacles. Projecting through the bottom of the casing 1 is a conveyer tube or pipe 7, through which grain may be blown into the chamber 8 from any suitable supply as, for example, a pneumatic conveyer, of which the tube 7 may form a part. At the top of the tube 7 is an upwardly curved deflector 9, the lower end of which is fastened to the tube and the upper end of which is adjustable in the arc of a circle, as indicated at 10, whereby the upper end may be moved toward and away from the inclined screen baffle 11, which is diagonally disposed with relation to and forms one wall of the chamber 8, dividing the casing into the chamber 8 and into a chamber 12, into which the dust, dirt and other extraneous matter, as well as the inferior grain, may pass through the meshes of the screen 11, it being apparent that the "A" grade grain will pass over the free end of the deflector and into the chamber 8, to be discharged through the chute 3 and nozzle 4 in a manner well understood. At the upper rear end of the chamber 12 is an air discharge port or opening 13, through which the air and lighter chaff, entering chamber 12, may pass either to atmosphere or to a bag or similar device, which may be fastened to the neck 14 of the port 13.

The inclined, transversely disposed baffles 15, in staggered relation within the chamber 12 and in rear of the reticulated baffle 11, will direct the heavier particles into the hopper-like bottom 16, to be discharged upon the jigger 17 in chamber 18 immediately below the chamber 12, the jigger constituting a screen for the hopper or nozzle 19 to which a tube, bag or similar device may be attached, and adjacent to the hopper or nozzle 19 is a corresponding hopper or nozzle 20, also in communication with chamber 18 and adapted to receive material discharged from the jigger 17, as will be presently explained. The jigger is hinged or pivoted upon a shaft 21 to which is rigidly fastened a crank arm 22, adapted to be vibrated by the paddles of a paddle wheel 23, pivoted to the pipe or tube 7 and having its paddle ends extending into the same so that as the grain passes through 7 into 8, the paddle wheel will be rotated about its axis and impart a vibratory motion to arm 22, which imparts a corresponding motion to the jigger or screen 17.

When the parts are assembled and air is forced through the tube or pipe 7 so as to pneumatically convey the unclean grain into the chamber 8, the stream will strike the deflector 9 where it will be flattened by coming in contact therewith and directed against the reticulated baffle 11, over which it passes. The more perfect grain designated "A" grade, will be of such size that it may not pass through the meshes of the screen 11 but will be directed into the forward portion of chamber 8 through the chute 3 and the spout 4, where it may be directed to a suitable repository. The secondary products, however, which pass into the chamber 12, will come in contact with the baffles 15 where the velocity of the stream will be arrested and the lighter chaff permitted to escape through the opening or port 13. The grain and some of the objectionable matter will drop through the hopper bottom 16 onto the jigger or screen 17, which will be vibrated as described, through the medium of the paddle wheel and vibratory arm 22 so that the smaller particles of grain will pass into the nozzle or hopper 19, while the chaff and remaining portions will be vibrated by the jigger into the hopper 20, where it may also be collected in a manner apparent to those skilled in the art.

What we claim and desire to secure by Letters-Patent is:

1. A grain separator and grader comprising a casing having a grain discharge port at one end and an air discharge port at the other, a reticulated baffle in the casing between the grain discharge and air discharge ports to divide the casing into a grain chamber and a grader chamber, a pneumatic conveyer pipe discharging into the grain chamber adjacent to the baffle, a deflector for directing the grain from the pneumatic conveyer toward the baffle, deflectors within the grader chamber, and grading devices below and in communication with the grader chamber.

2. A grain separator and grader comprising a casing having a grain discharge port at one end and an air discharge port at the other, a reticulated baffle in the casing between the grain discharge and air discharge ports to divide the casing into a grain chamber and a grader chamber, a pneumatic conveyer pipe discharging into the grain chamber adjacent to the baffle, a curved deflector in the grain chamber for flattening the grain stream against the deflector whereby the extraneous matter will pass through the reticulated baffle and the grain will be retained within the grain chamber, and means for collecting the material in the grader chamber.

3. A grain separator and grader comprising a casing having a grain discharge port at one end and an air discharge port at the other, a reticulated baffle in the casing between the grain discharge and air discharge ports to divide the casing into a grain chamber and a grader chamber, a pneumatic conveyer pipe discharging into the grain chamber adjacent to the baffle, a curved deflector comprising a relatively flat strip having a portion parallel with the reticulated baffle to flatten the grain stream discharging from the pneumatic conveyer and to direct the extraneous matter through the reticulated baffle, and means for collecting the material discharged into the grader chamber.

4. A combined separator and grader comprising a casing having a primary grain chamber and a secondary grain chamber, a reticulated wall separating the two chambers, means for directing a stream of grain against the reticulated wall whereby the larger particles will be screened out, the larger grain of the stream to be thrown back into the first grain chamber, the secondary grain passing into the secondary chamber, a third chamber below the secondary chamber, spouts discharging therefrom, and a jigger screen in the path of one of said spouts.

5. A combined separator and grader comprising a casing having a primary grain chamber and a secondary grain chamber, a reticulated wall separating the two chambers, means for directing grain against the reticulated wall whereby the larger particles will be screened out, the stream to remain in the first grain chamber, the secondary grain passing into the secondary chamber, a third chamber below the secondary chamber, spouts discharging therefrom, and a jigger screen in the path of one of said spouts, said jigger screen comprising a reticulated sheet, means for pivoting said sheet, a vibratory arm for actuating the sheet, and a paddle wheel having ends entering the pneumatic conveyer and adapted to contact with the vibratory arm.

In testimony whereof we affix our signatures.

HALBERT C. WALLACE.
OTTO N. GREDELL.